No. 739,444.

Patented September 22, 1903.

UNITED STATES PATENT OFFICE.

ALEXANDER S. RAMAGE, OF CLEVELAND, OHIO.

PIGMENT AND METHOD OF PRODUCING IT.

SPECIFICATION forming part of Letters Patent No. 739,444, dated September 22, 1903.

Application filed May 27, 1903. Serial No. 159,023. (No specimens.)

*To all whom it may concern:*

Be it known that I, ALEXANDER S. RAMAGE, a citizen of the United States, residing at Cleveland, in the county of Cuyahoga and State of Ohio, have invented certain new and useful Improvements in Pigment and Method of Producing it from Ferrous Liquors, of which the following is a specification.

This invention relates to the production of a composite ferric pigment, which by calcination can be converted into an Indian red of extreme brilliance and soft velvety texture. This pigment is produced from the waste pickle liquor of sheet-iron and iron wire-works, which is a crude solution of ferrous sulfate containing a small amount of free acid.

The method comprises two principal steps or operations, which are preferably carried out in sequence. In the first stage of the process the ferrous liquor is treated to throw down a yellow basic ferric sulfate. In the second stage the residual liquor is treated to precipitate the remaining iron as a ferroferric oxid, which impregnates or coats the particles of the basic sulfate precipitate.

In a previous patent, No. 691,324, granted to me January 14, 1902, I have described and claimed the production of a basic ferric hydrate by diffusing air through ferrous-sulfate liquors in the presence of a sufficient volume of water to hydrolize the basic ferric sulfate produced by the oxidizing action of the air. I have now found that if a concentrated ferrous sulfate solution be employed, having a density of at least 15° Baumé, the product obtained by oxidizing the solution by the injection of air or air and steam is a basic sulfate of the formula $Fe_2O_3,Fe_2(SO_4)_3$, having a brilliant yellow color, like that of the hydrate, but of much greater specific gravity. In the first stage of the process I throw down a certain amount of the iron in the solution, usually twenty-five per cent., as such basic sulfate. If the pickle liquor employed contains any free acid, it is desirable to first neutralize it, as by adding sodium carbonate. Streams of air or of air and steam are then injected through the solution until the desired amount of iron is precipitated. It is desirable to maintain the liquor in a neutral condition during this operation, as by adding an alkali hydroxid or carbonate from time to time.

In the second stage of the process the residual liquor from the first operation is oxidized by the injection of air or air and steam until about two-thirds of the remaining iron is converted into the ferric state. This is ascertained in the usual manner by titration of a sample of the liquor by normal potassium bichromate. It is desirable that the solution at this stage should be considerably more dilute than in the previous operation, and the liquor should be heated preferably to about 180° Fahrenheit. If steam is injected in connection with air, it will generally furnish sufficient heat and water of condensation for the purpose. The injection of air is now discontinued and a solution of an alkali hydroxid or carbonate is run into the liquor, which is constantly agitated during its addition until all of the iron remaining from the first stage of the process—that is, seventy-five per cent. of the original contents of the pickle liquor—is precipitated. This second precipitate is a black ferroferric oxid of the formula $Fe_2O_3,FeO$, the precipitation of the anhydrous oxid being due to the high temperature of the liquor. By thus throwing down successive precipitates from the liquor the particles of the basic sulfate produced by the first operation become thoroughly impregnated or coated with the ferroferric oxid subsequently precipitated. The residual liquor is filtered off from the pigment, which is collected and dried. This composite pigment when calcined gives a brilliant Indian red of velvety texture and great commercial value.

The composite pigment may be produced by separately precipitating the basic sulfate and ferroferric oxid and then mechanically mixing the two precipitates. Such product, however, is inferior to the one produced by successively throwing down the sulfate and oxid from the same liquor in that the mixture is not sufficiently intimate, whereas in the product of the preferred method the oxid is precipitated upon the surface of the particles of sulfate.

I claim—

1. The method of producing pigments from ferrous sulfate liquors, which consists in precipitating from the liquor predetermined amounts of basic ferric sulfate and ferroferric oxid, and combining said sulfate and oxid precipitates, as set forth.

2. The method of producing pigments from ferrous sulfate liquors, which consists in precipitating from the liquor predetermined amounts of basic ferric sulfate and ferroferric oxid, combining said sulfate and oxid precipitates, and drying and calcining the pigment, as set forth.

3. The method of producing pigments from ferrous sulfate liquors, which consists in first precipitating a basic ferric sulfate, and then precipitating upon said sulfate a ferroferric oxid, as set forth.

4. The method of producing pigments from ferrous sulfate liquors, which consists in first precipitating a basic ferric sulfate, then precipitating upon said sulfate a ferroferric oxid, and drying and calcining the pigment, as set forth.

5. The method of producing pigments from ferrous sulfate liquors, which consists in first blowing the concentrated liquor with air and neutralizing the acid set free, thereby precipitating basic ferric sulfate, oxidizing the residual liquor until about two-thirds of the remaining iron is converted into the ferric state, heating the liquor and adding a reagent to precipitate the remaining iron as a ferroferric oxid, which is deposited upon the particles of the basic sulfate precipitate, as set forth.

6. The method of producing pigments from ferrous sulfate liquors, which consists in first blowing the concentrated liquor with air and neutralizing the acid set free, thereby precipitating basic ferric sulfate, oxidizing the residual liquor until about two-thirds of the remaining iron is converted into the ferric state, heating the liquor and adding a reagent to precipitate the remaining iron as a ferroferric oxid, which is deposited upon the particles of the basic sulfate precipitate, and drying and calcining the pigment, as set forth.

7. A composite pigment, consisting of a mixture of basic ferric sulfate, having the formula $Fe_2O_3, Fe_2(SO_4)_3$, and ferroferric oxid, having the formula $Fe_2O_3, FeO$, as set forth.

8. A composite pigment, consisting of particles of basic ferric sulfate, having the formula $Fe_2O_3, Fe_2(SO_4)_3$, impregnated or coated with ferroferric oxid, having the formula $Fe_2O_3, FeO$, as set forth.

In testimony whereof I affix my signature in presence of two witnesses.

ALEXANDER S. RAMAGE.

Witnesses:
ROB. CHAS. HAMILTON,
A. E. GILBERT.